United States Patent [19]
Chu

[11] 3,902,981

[45] Sept. 2, 1975

[54] PROCESS FOR ELECTROPHORETIC DEPOSITION

[75] Inventor: Edward Chu, Philadelphia, Pa.

[73] Assignee: E. I. du Pont de Nemours and Company, Wilmington, Del.

[22] Filed: July 6, 1973

[21] Appl. No.: 377,088

Related U.S. Application Data

[63] Continuation of Ser. No. 142,383, May 11, 1971, abandoned.

[52] U.S. Cl. ............................................ 204/181
[51] Int. Cl.² .................................... C25D 13/06
[58] Field of Search ................................. 204/181

[56] References Cited
UNITED STATES PATENTS

| | | | |
|---|---|---|---|
| 3,663,728 | 5/1972 | Hoback et al. | 204/181 |
| 3,679,618 | 7/1972 | Lohr | 204/181 |
| 3,702,813 | 11/1972 | Tanaka et al. | 204/181 |
| 3,766,117 | 10/1973 | McQuade | 204/181 |

*Primary Examiner*—Howard S. Williams

[57] ABSTRACT

In the process of coating a film-forming polymer on an electrode by electrophoretic process using a composition that comprises a continuous phase and a dispersed phase, the improvement comprising:

A. using a dispersed phase comprising polymer, said polymer
 1. being water-insoluble,
 2. having a glass transition point of at least 10°C,
 3. being formed from ethylenically unsaturated monomers, and
 4. being capable of being coated onto a suitable substrate by electrophoretic process, and B. said continuous phase comprising water and a strong solvent for said polymer, said strong solvent being present in an amount sufficient to cause a limiting film of polymer to be formed on an electrode in an electrophoretic process.

12 Claims, No Drawings

PROCESS FOR ELECTROPHORETIC DEPOSITION

This is a continuation of application Ser. No. 142,383, filed May 11, 1971, now abandoned.

BACKGROUND OF THE INVENTION

This invention relates to a process useful for coating suitable substrates with film-forming polymer by electrophoretic process.

Existing processes for coating, by electrophoretic process, relatively high molecular weight polymers (that is having a molecular weight above about 5,000 such as those produced by emulsion or dispersion polymerization) have been found to be less than entirely satisfactory because non-limiting films are formed. As a consequence such films are often cracked, non-uniform and the polymer therein is not coalesced to an acceptable degree. Furthermore, it is often difficult to cover adequately sharp edges as exist for example in square or rectangular wire.

SUMMARY OF THE INVENTION

According to the present invention there is provided:
In the process of coating a film-forming polymer on an electrode by electrophoretic process using a composition that comprises a continuous phase and a dispersed phase, the improvement comprising:
A. using a dispersed phase comprising polymer, said polymer
   1. being water-insoluble,
   2. having a glass transition point of at least 10°C,
   3. being formed from ethylenically unsaturated monomers,
   4. being capable of being coated onto a suitable substrate by electrophoretic process, and
B. said continuous phase comprising water and a strong solvent for said polymer, said strong solvent being present in an amount sufficient to cause a limiting film of polymer to be formed on an electrode in an electrophoretic process.

If desired the above described compositions can contain thermosetting nitrogen resin and/or polymer of tetrafluoroethylene and/or copolymer of tetrafluoroethylene/hexafluoropropylene.

It has been found that the process of this invention forms limiting films of polymer on an electrode in an electrophoretic process. Such films are non-cracked, uniform, and the polymer therein is coalesced excellently. Furthermore, the process of this invention provides excellent coverage over sharp edges such as exist for example in square or rectangular wire.

DESCRIPTION OF THE INVENTION

The polymers used in this invention are water insoluble, have a glass transition point of at least 10°C., have a molecular weight of greater than about 5,000, are formed from ethylenically unsaturated monomers and are capable of being coated onto a suitable substrate by electrophoretic process.

Suitable ethylenically unsaturated monomers include esters of acrylic acid with alkanols having about 1 through 10carbon atoms such as methyl acrylate, ethyl acrylate, propyl acrylate, isopropyl acrylate, the various butyl acrylates, cyclohexyl acrylate, 2-ethylhexyl acrylate, n-hexyl acrylate, n-octyl acrylate, t-octyl acrylate and the like; esters of methacrylic acid with alkanols having about 1 through 10 carbon atoms such as methyl methacrylate, ethyl methacrylate, propyl methacrylate, isopropyl methacrylate, the various butyl methacrylates, cyclohexyl methacrylate, n-hexyl methacrylate, 2-ethylhexyl methacrylate, n-octyl methacrylate, t-octyl methacrylate and the like; vinyl esters of fatty acids having about 2 through 20 carbon atoms such as vinyl acetate, vinyl propionate, vinyl butyrate, vinyl valerate, vinyl hexanote, vinyl octonate, vinyl α,α-dimethyloctonate, vinyl oleate, vinyl laurate, vinyl palmitate, vinyl stearate and the like; 2-sulfoethyl methacrylate, acrylic acid, methacrylic acid, itaconic acid, maleic anhydride, crotonic acid, alkyl acetic acid, vinyl sulfonic acid and the like, N,N-dimethylaminoethyl methacrylate, t-butylaminoethyl methacrylate, aminoethyl methacrylate, 4-vinyl pyridine, aminoethyl vinyl ether, acrylic acid or methacrylic acid that has been iminated, that is reacted with an alkylene imine such as ethylene imine or propylene imine, etc., styrene, chloroprene, vinyl chloride, vinylidene chloride, acrylonitrile, butadiene, 1-butene, methacrylonitrile, vinyl toluene, chlorostyrene, dichlorobutadiene, and the like. Mixtures of the foregoing can be used. The preferred monomers are the ones that have been underlined.

Particularly preferred monomers are (1) acrylonitrile, (2) α-olefinic monocarboxylic acid such as acrylic acid, methacrylic acid, ethacrylic acid, phenyl acrylic acid and crotonic acid, and (3) ester of at least one alpha-olefinic monocarboxylic acid with at least one saturated aliphatic monohydric alcohol of 1–8 carbon atoms.

Preferred polymers include polymers of (A) 10 to 90 parts by weight acrylonitrile, (B) 0.5 to 15 parts by weight alpha-olefinic monocarboxylic acid selected from the group consisting of acrylic acid, methacrylic acid, ethacrylic acid, phenyl acrylic acid, and crotonic acid, and (C) 9.5 to 89.5 parts by weight of an ester of at least one of said alpha-olefinic monocarboxylic acids with a saturated aliphatic monohydric alcohol of 1 to 8 carbon atoms.

Especially preferred polymers include those of (A) 30 to 80 parts by weight acrylonitrile, (B) 2 to 15 parts by weight alpha-olefinic monocarboxylic acid selected from the group consisting of acrylic acid, methacrylic acid, ethacrylic acid, phenyl acrylic acid, and crotonic acid, and (C) 15 to 65 parts by weight of an ester of at least one of said alpha-olefinic monocarboxylic acids with a saturated aliphatic monohydric alcohol of 1 to 8 carbon atoms.

The especially preferred polymers are described in Sanderson U.S. Pat. No. 3,032,521, issued May 1, 1962, the disclosure of which is hereby incorporated by reference.

The polymers are formed by any suitable method that will produce a polymer having a molecular weight of at least about 5,000. A preferred method is emulsion polymerization in an aqueous medium. A suitable process for making the polymers is described in the aforementioned U.S. Pat. No. 3,032,521.

Conventional polymerization initiators can be used such as inorganic peroxides, salts of inorganic peroxides, azonitrile compounds, and redox (reduction/oxidation) compounds. Preferred are redox initiators such as sodium bisulfite and potassium persulfite in a weight ratio respectively of 1:1 to 1:10.

If an emulsion polymerization system is used, preferably a dispersing agent (such as sodium lauryl sulfate) in the normal amounts (often between about 0.25 and 4 percent based on the weight of monomers) can be used.

To produce the polymer, the monomers, polymerization initiator, dispersing agent (if used) and suitable reaction media such as water, are charged into a suitable reaction vessel. The reaction mixture is then brought to a suitable reaction temperature which is maintained until the reaction is complete. Generally, the temperature can be about 25°–200°C. for about ¼ to 24 hours.

In the preferred method of polymerization in an aqueous media, water is added to the reaction vessel followed by deoxygenization by refluxing for about 15 minutes under an atmosphere of nitrogen. Then, the dispersing agent is added to the deoxygenated water followed by the addition of sodium bisulfite, monomers and potassium persulfate. The reaction mixture is then maintained at a suitable temperature for a sufficient time to cause polymerization. The temperature can be from about room temperature to about the reflux temperature of the mixture for a time of about ½ to 24 hours. Preferably, the reaction mixture will be maintained at about 110°–180°C., most preferably about 140°C., for about 2 hours. Preferably, during the reaction, an inert atmosphere such as nitrogen is maintained over the reaction mixture.

The polymers have a glass-transition point of at least 10°C. and preferably at least about 25°C. Although it is difficult to place any precise upper limit on the glass transition point, no benefit is seen at the present time in having a glass transition point of greater than about 350°C. and more preferably, no greater than about 250°C.

The polymers have a molecular weight of at least about 5,000. The upper limit of the molecular weight can be quite high and is difficult to set a numerical upper limit since when a polymer has a high molecular weight, it is sometimes difficult to determine its molecular weight with precision. However, at the present time, no benefit is seen in using a polymer having a molecular weight any greater than about 2–5 million.

The polymers are capable of being coated onto a suitable substrate by electrophoretic process. This concept is well known in the art and therefore will not be described in great detail. Generally, this means that the polymer will contain ionizable functionality, and/or polar functionality, and/or will be used in conjunction with additives that will cause the polymer to be electrocoatable. Such additives, for example, can be substances that ionize and interact with and/or become associated with the polymer to thereby render them capable of being coated onto a suitable substrate by electrophoretic process. Preferably, the polymer will contain carboxylic functionality such as results from the incorporation in the polymer of monomer units of acrylic acid, methacrylic acid, itaconic acid, maleic anhydride, crotonic acid and the like.

Many of the existing compositions useful for electrophoretic processes require that the polymer therein be neutralized with water-soluble amino compounds. See for example Gilchrist U.S. Pat. No. 3,230,162 issued Jan. 18, 1966 the disclosure of which is hereby incorporated by reference. However, the compositions used in the process of this invention do not require neutralization with a water-soluble amino compound. But even though such water-soluble amino compounds are not required, they may be used if desired without any detrimental effect.

If desired, a thermosetting nitrogen resin can be used with the above described polymers. Thermosetting nitrogen resins include condensates of phenol compound with aldehyde compound, melamine with aldehyde compound, urea with aldehyde compound, or benzoguanamine with aldehyde compound. Suitable phenol compounds include phenol, substituted phenols such as cresols, xylenols, resorcinols, naphthols, and more specifically 2:4 dimetnylol phenol, 2:4:6 trimethylol phenol and 3 methyl:2:6-dimethylol phenol. Suitable aldehyde compounds include formaldehyde, acetaldehyde, and furfural. Examples of specific thermosetting nitrogen resins include phenol-formaldehyde resin, alkylated melamine formaldehyde resins such as partially methylolated or butylated melamine formaldehyde resins, and wholly alkylated melamine formaldehyde resins such as, for example hexamethoxymethylol melamine. Preferred is phenol-formaldehyde resin.

Thermosetting nitrogen resins include also aliphatic or aromatic polyisocyanates including:

4,4',4''-triisocyanato triphenyl methane
1,3,5-triisocyanato benzene
2,4,6-triisocyanato toluene, and the like
biurets of diisocyanates such as the trimerization product of hexane-1,6-diisocyanate of the formula:

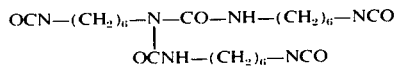

toluyl-2,4,6-triisocyanate
naphthalene-1,3,7-triisocyanate
diphenylmethane-2,4,4'-triisocyanate
triphenylmethane triisocyanate
adduct of one or more diisocyanate with one or more polyol containing about 3 to about 6 hydroxyl groups (such as propane triol, 1,2,6-hexane triol, trimethylolpropane, pentaerythritol, sorbitol and the like) to obtain a cross-linker having a functionality of greater than 2 but no greater than about 8.

A preferred polyisocyanate is the adduct of aromatic diisocyanates with trimethylolpropane such as the adduct of toluene-2,4-diisocyanate, toluene-2,6-diisocyanate or mixtures thereof with trimethylolpropane.

The diisocyanates for use in forming the polyisocyanates can be aliphatic or aromatic. Suitable diisocyanates include:

hexane-1,6-diisocyanate
decane-1,10-diisocyanate
diisocyanates derived from dimerized fatty acids
phenylene-1,4-diisocyanate
toluene-2,4-diisocyanate
toluene-2,6-diisocyanate
naphthylene-1,5-diisocyanate
diphenylmethane-4,4'-diisocyanate
diphenylmethane-3,3'-dimethoxy-4,4'-diisocyanate
dicyclohexylmethane-4,4'-diisocyanate, etc.

Preferred is toluene 2-4-diisocyanate, toluene 2,6-diisocyanate or mixtures thereof.

Often the polyisocyanate will be blocked with a suitable compound such as phenol, cresylic acid or methyl ethyl ketoxine so that the polyisocyanate will be ordinarily non-reactive at room temperature but will react at higher temperatures such as during baking of electrophoretically coated polymer.

The thermosetting nitrogen resin has an average functionality greater than 2. At the present time no reason is seen to use a thermosetting nitrogen resin having an average functionality greater than about 8. Often the thermosetting nitrogen resin will have an average functionality of about 3–6; preferably it will have an average functionality of about 4–6 and more preferably about 4–5 and most preferably about 4.

The thermosetting nitrogen resin can be present in the following percentages based on the combined weight of the thermosetting nitrogen resin and the polymer of ethylenically unsaturated monomers: generally 0.5–80 percent, preferably 5–80 percent, more preferably 10–70 percent and most preferably about 30–50 percent.

If desired the compositions of this invention can contain about 0.5–30 percent by weight, preferably about 5–10 percent by weight of polymer of tetrafluoroethylene (TFE) or copolymer of hexafluoropropylene (HEP) and tetrafluoroethylene or mixtures thereof. The foregoing weight percents are based on the total weight of the film-forming polymer in the composition i.e., polymer of ethylenically unsaturated monomer, thermosetting nigrogen resin (if used) and polymer of TFE, copolymer of TFE/HEP or mixtures thereof.

The PTFE used in this invention is described in U.S. Pat. No. 2,230,654 the disclosure of which is hereby incorporated by reference.

The TFE/HFP copolymers used in this invention can have weight ratios of 5-95/5-95. The preferred copolymers, because of the stability of the dispersions formed with them, are the 50-95/5-50 TFE/HFP copolymers. Even more preferred are the 75-95/5-25 TFE/HFP copolymers. Most preferred are the 93-95/5-7, the 84-88/12-16 and the 75-80/20-25 copolymers, specifically the 95/5, 85/15 and 75/25 copolymers. The 1-5/95-99 copolymers can also be used, as can those whose TFE/HFP monomer ratios range from 95-100/0-5.

Methods for preparing such copolymers are described in U.S. Pat. No. 2,946,763 to M. I. Bro, et al. the disclosure of which is hereby incorporated by reference.

Generally, the strong solvent will be one that will cause the polymer of ethylenically unsaturated monomers to form a limiting film in an electrophoretic process. To determine whether a strong solvent is suitable for a particular polymer, one merely uses that strong solvent in conjunction with that polymer and water to make up the electrophoretic bath. If the polymer is deposited on the electrode workpiece and a limiting film is produced (thereby resulting in a polymer film that is uniform, non-blistered, not cracked and can cover sharp edges and/or irregular shapes), the strong solvent is suitable for use in an electrophoretic process. As is known by those skilled in the art, limiting film formed by electrophoretic process means that after a layer of a certain thickness of polymer is deposited on the electrode workpiece, no more polymer will be deposited or deposition will be at a much slower rate than initially. This limiting film allows the electrode workpiece to be coated with a layer of polymer of substantially uniform thickness, even if the electrode is irregular in shape.

As another method of determining whether a limiting film is being formed, one can make a bath of aqueous dispersion of polymer of ethylenically unsaturated monomer and strong solvent, and then use this bath for electrophoretic process a constant voltage. A graph is made of the electrophoretic process with current plotted on the vertical axis and time plotted on the horizontal axis. Almost immediately after the voltage is applied, a maximum current will be obtained after which, the current will decrease with passage of time. Eventually, the graph will approach or reach a horizontal line. Thus, in general, after the maximum current has been obtained, the average slope of the graph will be negative with the slope eventually approaching or reaching zero.

Such a graph defines the formation of a limiting film. When maximum current has been reached, the polymer is being deposited at a maximum rate. Thereafter, as the current decreases, the polymer is being deposited at a slower rate. Finally, when the graph approaches or reaches a horizontal line, the polymer (a) is being deposited at an essentially constant, very much slower rate as compared to the initial rate of application or (b) the deposition of the polymer has essentially stopped.

Note, however, that in the actual electrophoretic process, one will allow the current to flow for sufficient time to obtain a deposited polymer film of the desired thickness. Thus, it is not necessary to allow sufficient time to pass to reach the point where the slope of the previously described graph approaches or reaches zero.

Often the strong solvent will have a total solubility parameter of about 8.5–16, preferably 10–16, more preferably about 11–16 and most preferably about 12.5–16. The solubility parameter of δ is defined as $$\delta = \left(\frac{E}{V}\right)^{\frac{1}{2}}$$

wherein
$E$ = the energy of vaporization to a gas at zero pressure; $V$ = the molal volume of the liquid.

Methods of determining solubility parameters are known and are set forth, for example, in *Polymer Handbook*, ed. by J. Bandrup and E. H. Immergut, N.Y. Interscience Vol. 4, 1966, p. 341–346 and Burrell, H. *Solubility Parameters* in Interchemical Review p. 3–16 Spring 1955.

The total solubility parameter of a mixture of more than one organic liquid is equal to $$\begin{pmatrix}\text{volume}\\\text{fraction}\\\text{organic}\\\text{liquid}_1\end{pmatrix}\begin{pmatrix}\delta\,\text{organic}\\\text{liquid}_1\end{pmatrix} + \begin{pmatrix}\text{volume}\\\text{fraction}\\\text{organic}\\\text{liquid}_2\end{pmatrix}\begin{pmatrix}\delta\,\text{organic}\\\text{liquid}_2\end{pmatrix} + \begin{pmatrix}\text{volume}\\\text{fraction}\\\text{organic}\\\text{liquid}_i\end{pmatrix}\begin{pmatrix}\delta\,\text{organic}\\\text{liquid}_i\end{pmatrix} +$$

Of course, the total solubility parameter of a single organic liquid is the solubility parameter of that organic liquid.

Suitable strong solvents include butyrolactone, N-methylpyrrolidone, tetrahydrofuran, methyl ethyl ketone, methyl isobutyl ketone, phenol, cresol, butyl cellosolve acetate, cellosolve acetate, tetramethylene sulfone, cyclic ethylene carbonate, dimethylformamide, dimethyl acetamide, alkyl monoethers of ethylene glycol or diethylene glycol, diacetone alcohol, acetone, acetonitrile, benzyl alcohol, n-butyl alcohol, cyclohexanol, ethylene glycol, ethyl formamide, methyl alcohol, diethyl formamide, propylene carbonate, propiolactone, dimethyl sulfoxide, ethyl alcohol, dipropyl sulfone, aniline, etc., or mixtures thereof. Preferred are butyrolactone, N-methylpyrrolidone or mixtures thereof.

Generally, the strong solvent will be present in an amount that is sufficient to cause a limiting film of the electrophoretically deposited polymer to be formed. Often the strong solvent will be present in a ratio of weight of strong solvent to sum of the weight of polymer of ethylenically unsaturated monomer plus weight of thermosetting nitrogen resin (if used) of at least about 0.3:1. At the present time, no benefit is seen in using a ratio of more than about 50:1. Preferably, the ratio will be about 1–13:1, more preferably about 2–12:1, still more preferably about 5–12:1, and most preferably about 8–11:1.

Ordinarily, the above described amount of strong solvent will be suitable for use in electrophoretic baths containing water in the amounts that are ordinarily used. As a further guide, without meaning to be limiting because strong solvents can function acceptably over wide ranges of amounts of water, the weight ratio of strong solvent to water often will be about 0.2–6:1, preferably 1–5:1, more preferably about 2–4:1 and most preferably about 2.5–4.5:1.

Ordinarily, the coating compositions of this invention will have a pH of about 2 to about 10, preferably about 4–8, and most preferably about 5–7.

The compositions of this invention can contain pigment in a pigment volume concentration up to about 30 percent; preferably, pigment volume concentrations of about 1–15 percent are used. The pigment volume concentration is the ratio expressed on a percent basis of the volume of pigment to the total volume of pigment plus film-forming materials of the composition; the volume of pigment is the volume of vehicle displaced by the pigment wet with vehicle. Suitable pigments include titanium dioxide, iron oxide, lead chromate, chromium oxide, phthalocyanines, carbon black, zinc oxide, magnesium oxide, antimony oxide, lithopone, zinc chromate, red lead, aluminum, zinc stearate, aluminum stearate, aluminum silicate, magnesium silicate, calcium sulfate, barium sulfate, silicon dioxide, potassium aluminum silicate, calcium carbonate, magnesium silicate, calcium silicate, amorphous silica, and the like.

The following examples illustrate the invention. All parts and percentages are by weight unless otherwise specified.

EXAMPLE 1

A bath was made by admixing the following: (a) 13.6 parts acrylic polymer dispersion. (The polymer consisted of 63% acrylonitrile, 32% butyl acrylate, and 5% methacrylic acid. The polymer was made by emulsion polymerization using the procedure described in U.S. Pat. No. 3,032,521, had a molecular weight of about 1–2 million, a glass transition point of about 45°C., and was water insoluble. The polymer existed as a dispersion of fine particles in water; the dispersion contained 33% solids.), (b) 17.6 parts water, (c) 65.0 parts butyrolactone (solubility parameter of about 13.3), and (d) 3.8 parts phenolic resin ("Bakelite BRL-1100" phenolformaldehyde resin, 65% solids, available from Union Carbide Corporation).

Copper wire of 24 gauge (that is about 20 mils in diameter) was annealed and degreased by passing it through a chamber containing superheated steam at about 800°F. The residence time in the chamber was about 0.23 minutes.

The annealed and degreased copper wire was then coated with acrylic polymer using the previously described bath. An electrophoretic process was used with a current of about 0.4 amp at about 225 volts. The residence time of the copper wire in the bath was about 0.0154 minutes.

The wire with a coating of acrylic polymer thereon was then baked in a 16 foot oven having an inlet temperature of about 200°F. and an outlet temperature of about 700°F. The residence time in the oven was about 0.25 minutes.

Excellent results were obtained. The baked electrocoated acrylic polymer film appeared to be non-porous and not blistered.

EXAMPLE 2

A bath was made up by admixing the following: (a) 14.0 parts of the acrylic polymer dispersion of Example 1, (b) 18.3 parts water, and (c) 67.7 parts butyrolactone.

Copper wire of 24 gauge was then annealed and degreased using the procedure described in Example 1.

The annealed and degreased copper wire was then coated with acrylic polymer using the above described bath. An electrophoretic process was used; the conditions were those described in Example 1.

Then the wire with a layer of acrylic polymer on it was baked at the conditions described in Example 1. Excellent results were obtained. The baked electrocoated acrylic polymer film appeared to be non-porous and not blistered.

EXAMPLE 3

Example 2 was repeated with the exception that the bath contained additionally about 1.03 parts of an aqueous dispersion of polytetrafluoroethylene (50 percent solids).

Excellent results were obtained. The baked polymer film appeared to be non-porous and not blistered.

The invention claimed is:

1. In the process of coating a film-forming polymer on an electrode by electrophoretic process using a composition that comprises a continuous phase and a dispersed phase, the improvement comprising:
  A. using a dispersed phase comprising thermosetting resin and polymer, said polymer formed from monomers selected from the group consisting of esters of acrylic acid with alkanols having 1 through 10 carbon atoms, esters of methacrylic acid with alkanols having 1 through 10 carbon atoms, vinyl esters of fatty acids having 2 through 20 carbon atoms, acrylonitrile and α-olefinic monocarboxylic acids, and said polymer
    1. being water-insoluble,
    2. having a glass transition point of at least 25°C.
    3. being capable of being coated onto a suitable substrate by electrophoretic process, said thermosetting resin being selected from the group consisting of a condensate of a phenol compound with an aldehyde compound, a condensate of melamine with an aldehyde compound, a condensate of urea with an aldehyde compound, a condensate of benzoguanamine with an aldehyde compound, a polyisocyanate and mixtures thereof, the resin being present in an amount of about 0.5 to 80 percent by weight based on the combined weight of the thermosetting resin and the polymer, and B. said continuous phase comprising water and a strong solvent for said polymer, said strong solvent being an organic liquid or a mixture of organic liquids having an overall solubility parameter of about 8.5–16.0, the weight ratio of said strong solvent:polymer being about 1–13:1 and the weight ratio of strong solvent to water being about 0.2–6:1.

2. The process of claim 1 wherein the polymer is formed from (A) 10 to 90 parts by weight acrylonitrile, (B) 0.5 to 15 parts by weight of α-olefinic monocarboxylic acid selected from the group consisting of acrylic acid, methacrylic acid, ethacrylic acid, phenyl acrylic acid, and crotonic acid, and (C) 9.5 to 89.5 parts by weight of an ester of at least one of said α-olefinic monocarboxylic acids with a saturated aliphatic monohydric alcohol of 1–8 carbon atoms.

3. The process of claim 2 wherein the strong solvent is butyrolactone, N-methylpyrrolidone or mixtures thereof.

4. The process of claim 1 wherein the polymer is formed from (A) 30 to 80 parts by weight acrylonitrile, (B) 2 to 15 parts by weight α-olefinic monocarboxylic acid selected from the group consisting of acrylic acid, methacrylic acid, ethacrylic acid, phenyl acrylic acid, and crotonic acid, and (C) 15 to 65 parts by weight of an ester of at least one of said α-olefinic monocarboxylic acids with a saturated aliphatic monohydric alcohol of 1 to 8 carbon atoms.

5. The process of claim 1 wherein the thermosetting resin is a thermosetting nitrogen resin in the amount of about 10 to 70 percent (by weight) based on the combined weight of the thermosetting nitrogen resin and the polymer and the weight ratio of strong solvent to polymer is about 2–12:1.

6. The process of claim 5 wherein the thermosetting nitrogen resin is phenol-formaldehyde resin.

7. The process of claim 5 containing polymer of tetrafluoroethylene or copolymer of hexafluoropropylene/tetrafluoroethylene in the amount of about 0.5–30 percent based on the combined weight of polymer of ethylenically unsaturated monomer, thermosetting nitrogen resin, and (i) polymer of tetrafluoroethylene or (ii) copolymer of tetrafluoroethylene/hexafluoropropylene.

8. The process of claim 1 wherein the thermosetting resin is a thermosetting nitrogen resin in the amount of about 30 to 50 percent (by weight) based on the combined weight of the thermosetting nitrogen resin and the polymer and the weight ratio of strong solvent to polymer is about 8–11:1.

9. The process of claim 8 wherein the thermosetting nitrogen resin is phenol-formaldehyde resin.

10. The process of claim 8 wherein the strong solvent is butyrolactone, N-methylpyrrolidone or mixtures thereof and the weight ratio of strong solvent to water is about 2.5–4.5:1.

11. The process of claim 1 containing polymer of tetrafluoroethylene or copolymer of hexafluoropropylene/tetrafluoroethylene in an amount of about 0.5–30 percent by weight based on the combined weight of the polymer of ethylenically unsaturated monomer, thermosetting nitrogen resin and (i) polymer of tetrafluoroethylene or (ii) copolymer of tetrafluoroethylene/hexafluoropropylene.

12. The process of claim 1 wherein the strong solvent is butyrolactone, N-methylpyrrolidone or mixtures thereof.

* * * * *